United States Patent [19]

Gonser

[11] 3,868,513
[45] Feb. 25, 1975

[54] ULTRAVIOLET RADIATION PROJECTOR
[75] Inventor: Donald I. Gonser, Forest Park, Ohio
[73] Assignee: Dentsply Research and Development Corporation, Milford, Del.
[22] Filed: Dec. 26, 1972
[21] Appl. No.: 318,251

[52] U.S. Cl. ................................ 250/504, 250/503
[51] Int. Cl. ............................. H01j 37/00
[58] Field of Search ....... 250/84, 88, 493, 503, 509; 313/112; 350/96 R

[56] References Cited
UNITED STATES PATENTS

| | | | |
|---|---|---|---|
| 1,590,283 | 6/1926 | Catlin | 250/88 |
| 1,800,277 | 4/1931 | Boerstler | 250/504 |
| 2,034,388 | 3/1936 | Cemach | 250/493 |
| 2,093,735 | 9/1937 | Prouty | 250/84 |
| 2,225,439 | 12/1940 | Arens et al. | 331/94.5 |
| 3,392,261 | 7/1968 | Schollhammer | 331/94.5 A |
| 3,712,984 | 1/1973 | Lienhard | 250/504 |

Primary Examiner—James W. Lawrence
Assistant Examiner—B. C. Anderson
Attorney, Agent, or Firm—James W. Pearce; Roy F. Schaeperklaus; J. Berkstresser

[57] ABSTRACT

An ultraviolet radiation projector which includes a radiation collecting rod and a gas discharge tube having a first section aligned with the radiation collecting rod and a second section helically wrapped around the radiation collecting rod. A window in the gas discharge tube is opposed to an end of the radiation collecting rod. Radiation is projected to a frusto-conic discharge head from which the radiation is discharged for curing a resin used to seal tooth crevices to inhibit tooth decay.

5 Claims, 14 Drawing Figures

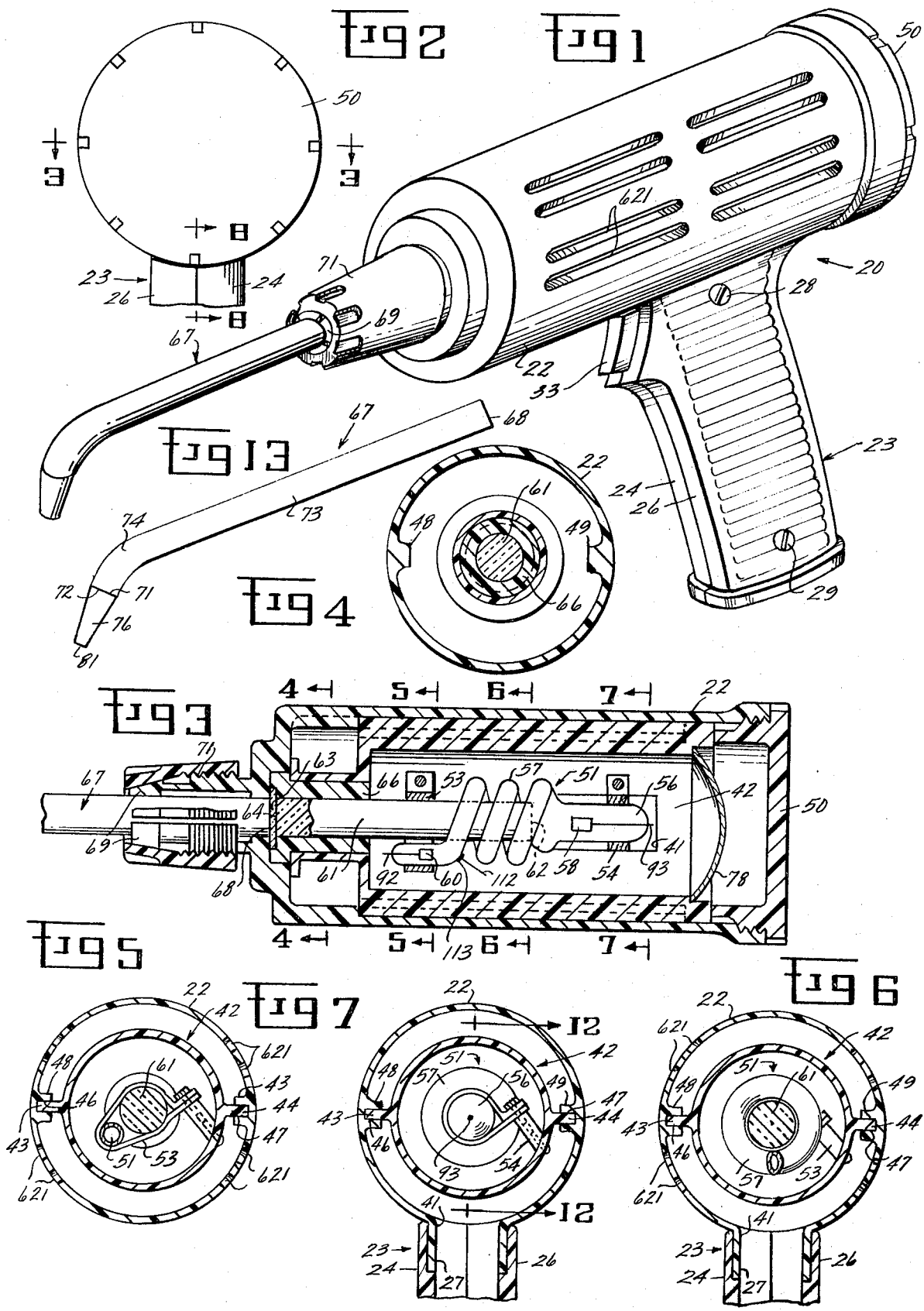

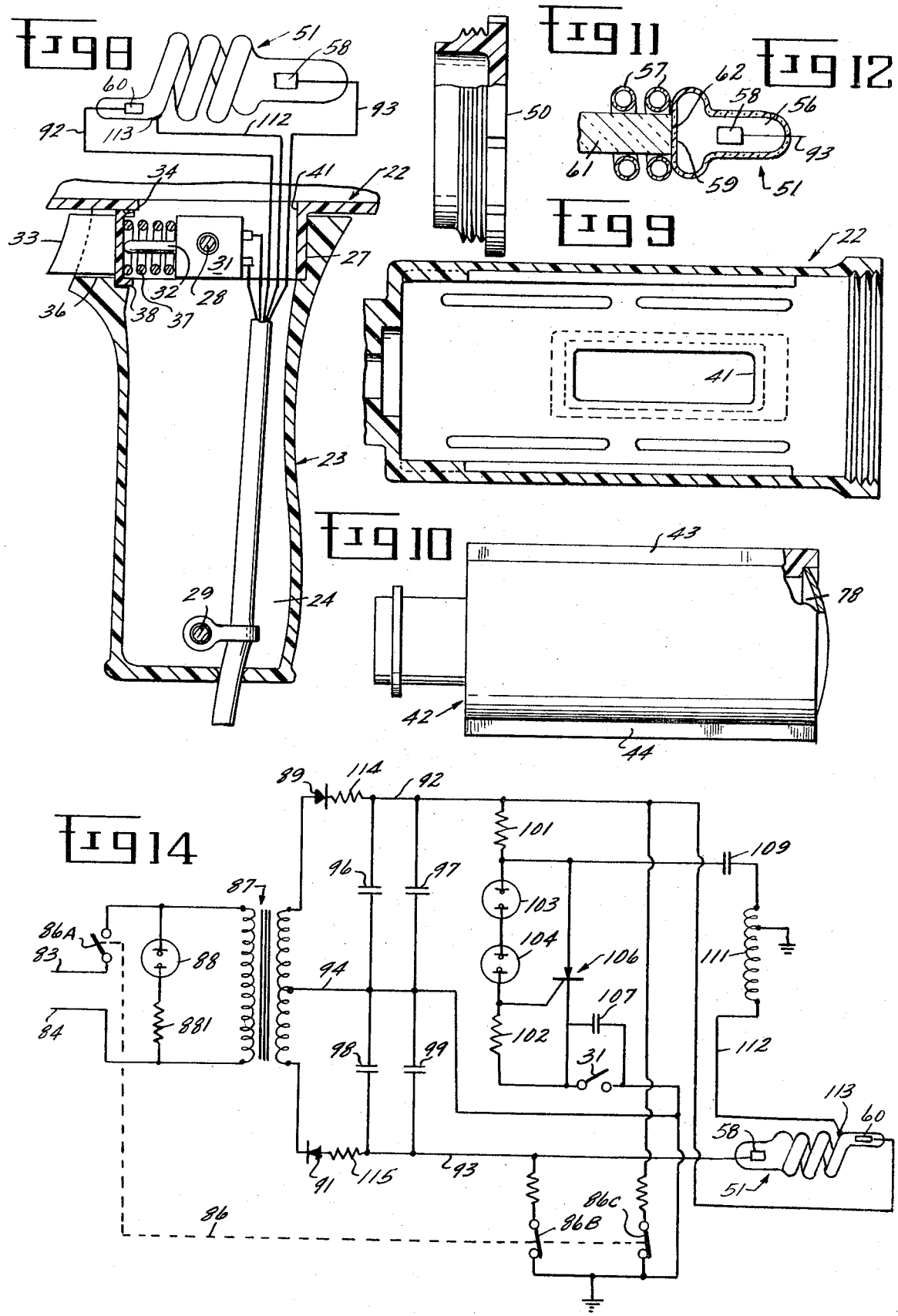

ULTRAVIOLET RADIATION PROJECTOR

This invention relates to a device for delivering a high intensity ultraviolet radiation. More particularly, this invention relates to a device which can project an intense ultraviolet radiation on a small area in a restricted location.

In the protection of teeth of children to decrease the incidence of cavities, it is known to apply a liquid resin which penetrates crevices in biting surfaces of the teeth and which can be cured by irradiating with ultraviolet radiation. However, previous devices for projecting ultraviolet radiation to the teeth surfaces have projected radiation of insufficient intensity to complete curing of the resin in a sufficiently short period to avoid discomfort of young patients.

An object of this invention is to provide an ultraviolet radiation projector which concentrates intense ultraviolet radiation on resin coated tooth surfaces to cause rapid curing of the resin.

In dentistry, similar resins are used as tooth filling materials, as cosmetic coatings, for the attachment of orthodontic fixtures to the teeth and for other like applications. A further object of this invention is to provide an ultraviolet radiation projector suitable for curing resins used for these applications.

A further object of this invention is to provide such a device in which ultraviolet radiation is produced by an elongated gas discharge tube and is projected through a window in the tube into an end of a radiation collecting quartz rod.

A further object of this invention is to provide such a device in which a major portion of the gas discharge tube is wound around the radiation collecting rod so that, although the discharge tube is of substantial length, the effective length thereof is reduced.

Briefly, this invention provides an ultraviolet projector which includes an elongated gas discharge tube which projects ultraviolet radiation through a window therein adjacent a cathode thereof into a quartz radiation collecting rod. A major portion of the gas discharge tube is helically wound around the radiation collecting rod. A radiation piping rod is aligned with the radiation collecting rod with an ultraviolet radiation filter being disposed therebetween so that the radiation piping rod receives ultraviolet radiation from the radiation collecting rod. The radiation collecting rod and the radiation piping rod can be approximately the same diameter as the gas discharge tube. However, an outer end portion of the radiation piping rod can be frusto-conic to direct the radiation to a small area.

The above and other objects of the invention will be apparent to those skilled in the art to which this invention pertains from the following detailed description and the drawings, in which:

FIG. 1 is a perspective view of an ultraviolet projector constructed in accordance with an embodiment of this invention;

FIG. 2 is a fragmentary view in rear elevation thereof;

FIG. 3 is a view in section taken on the line 3—3 in FIG. 2;

FIG. 4 is a view in section taken on the line 4—4 in FIG. 3;

FIG. 5 is a view in section taken on the line 5—5 in FIG. 3;

FIG. 6 is a view in section taken on the line 6—6 in FIG. 3;

FIG. 7 is a view in section taken on the line 7—7 in FIG. 3;

FIG. 8 is a view in section taken on the line 8—8 in FIG. 2;

FIG. 9 is a view in section of a body of the ultraviolet projector taken on the same line as FIG. 2;

FIG. 10 is a plan view of an inner housing of the projector, partly broken away and in section;

FIG. 11 is a plan view of an end plug of the projector partly broken away and in section;

FIG. 12 is a fragmentary view in section taken on the line 12—12 in FIG. 7;

FIG. 13 is a view in side elevation of a light piping rod of the projector; and

FIG. 14 is a wiring diagram for the projector.

In the following detailed description and the drawings, like reference characters indicate like parts.

In FIG. 1 is shown an ultraviolet projector 20 constructed in accordance with an embodiment of this invention. The projector 20 includes a hollow body 22 and a handle 23. Sections 24 and 26 of the handle 23 are held in assembled relation on a collar 27 (FIG. 8) of the body 22 by fasteners 28 and 29 (FIG. 1). A switch 31 is mounted on and held in position between the handle sections 24 and 26 by the fastener 28. A push button 32 (FIG. 8) of the switch 31 can be depressed by a finger held plunger 33 which is slidably mounted in a slot 34 in the collar 27 and in a slot 36 in the handle section 24. A compression spring 37 urges the plunger 33 to the position shown in FIG. 8 at which a flange 38 thereof engages the handle section 24. An opening 41 in the body 22 inside the collar 27 provides communication between the inside of the body 22 and the inside of the handle 23.

Inside the body 22 is mounted a tubular housing 42 (FIGS. 3 and 10) provided with outwardly extending flanges 43 and 44 which are received in slots 46 and 47 (FIG. 5) in inwardly extending flanges 48 and 49, respectively, on the interior of the body 22. An end cap 50 threaded in the body 22 closes the right hand end of the body 22 as shown in FIGS. 2 and 3. A gas discharge tube 51 (FIG. 3) is mounted inside the housing 42. Tube supports 53 and 54 are attached to the inside of the housing 42 and support the gas discharge tube 51. As shown in FIG. 3, the gas discharge tube 51 has an elongated hollow body including a first straight portion 56 and a helical portion 57. An end of the helical portion extends from the straight portion approximately at right angles thereto. A cathode 58 is disposed in the straight portion 56 and opposite a window 59 (FIG. 12) therein. An anode 60 (FIG. 3) is disposed adjacent the remote end of the helical portion 57. A cylindrical radiation collecting rod 61, which can be formed of ultraviolet conducting material such as quartz, is mounted inside the helical portion 57 of the gas discharge tube 51 with a transverse face 62 (FIG. 12) thereof opposed to the window 59. Slots 621 (FIGS. 1 and 5) are provided in the body 22 to permit air to circulate around the housing 42 to cool the housing 42. Ultraviolet radiation from the gas discharge tube 51 passes through the window 59 into the radiation collecting rod 61. A filter 63 which passes non-harmful ultraviolet radiation (FIG. 3) is held opposed to a second transverse face 64 of the radiation collecting rod 61 by a tubular filter holder 66, which is held in engagement with the filter 63 by the housing 42. A commercial filter which will pass approximately 93 percent of the radiation of a wave length of 3600 Angstrom but not more than approximately 1 percent of the radiation of wave lengths shorter than 3000 Angstrom is suitable. The ultraviolet radiation passes through the filter 63 into an elongated radiation piping rod 67 of ultraviolet conducting material such as quartz. A transverse face 68 of the rod 67 faces the filter 63. The rod 67 is held by chuck jaws 69. The jaws 69 are urged together by a chuck closing nut 71 to grip the radiation piping rod 67 firmly.

As shown in FIG. 13, the radiation piping rod 67 includes an elongated main portion 73 and a curved portion 74. The radius of curvature of the curved portion is sufficiently large so that there is no substantial loss of the ultraviolet radiation through the wall of the curved portion 74. A frusto-conic radiation distributing head 76 is attached to the left hand end of the rod 67 with a base face 71 of the head 76 engaging flatwise against a transverse face 72 of the rod 67. An appropriate ultraviolet passing adhesive can be used to attach the head 76 to the rod 67. The head 76 can also be formed of ultraviolet conducting material such as quartz.

A spherical reflector 78 (FIG. 3) is mounted in the housing 42 behind the straight portion 56 of the gas discharge tube 51 to direct ultraviolet radiation escaping therefrom to the right as shown in FIG. 3 to return into the tube 51. The side walls of the rod 67 and of the head 76 can be coated with reflective aluminum to return into the rod 67 and the head 76 any ultraviolet radiation which exits therefrom through the side walls. However, the faces 68 and 72 of the rod 67, the face 71 of the head 76 and a face 81 of the head 76 are free of aluminum coating. The area of the face 81 can be of approximately the area of a tooth surface to be irradiated. The diameter of the radiation collecting rod 61 and the diameter of the radiation piping rod 67 can be substantially equal to the diameter of the straight section of the gas discharge tube 51. Anti-reflection coatings can be applied to the faces of the filter 63, the face of the radiation collecting rod 61 adjacent the filter 63, the face 68 of the radiation piping rod 67 adjacent the filter, and the face 81 (FIG. 13) of the head 76. The gas discharge tube can be a xenon filled tube which provides a good source of ultraviolet radiation. The length of the gas discharge tube can be sufficient to permit proper operation thereof, but the length of the space occupied thereby is sufficiently short for convenience because a major portion of the length of the gas discharge tube is in the helical section thereof surrounding the radiation collecting rod 61.

The housing 42 and the reflector 78 are formed of material which is opaque to ultraviolet radiation and preferably are of highly reflective material such as aluminum polished on the interior faces. The housing 42 and the reflector 78 serve as shields surrounding the tube 51 to prevent escape of unwanted radiation.

The operation of the ultraviolet radiation projector will now be described with particular reference to FIG. 14 which shows electrical connections thereof. Electric power is supplied by power leads 83 and 84. When contacts 86A of a main switch 86 are closed, the power leads are connected across the primary winding of a transformer 87. A lamp 88 connected in parallel with the primary winding is energized when the transformer is energized. A resistor 881 mounted in series with the lamp 88 protects the lamp 88 to increase the life of the lamp 88. When the contacts 86A are closed, contacts 86B and 86C of the switch 86 are open. The ends of the secondary winding of the transformer 87 are connected through rectifier diodes 89 and 91 and resistors 114 and 115 to leads 92 and 93. The resistors 114 and 115 limit the current through the diodes 89 and 91, respectively, to protect the diodes 89 and 91. A lead 94 connected to the midpoint of the secondary winding is connected to ground. Large capacity capacitors 96 and 97 are connected between the leads 92 and 94 to be charged thereby. Large capacity capacitors 98 and 99 are connected between the leads 93 and 94 to be charged thereby. The anode 60 and the cathode 58 of the gas discharge tube 51 are connected to the leads 92 and 93 respectively so that the capacitors 96, 97, 98 and 99 can be discharged through the gas discharge tube 51 when the tube 51 is rendered conducting. A trigger timing circuit for the gas discharge tube includes resistors 101 and 102, gas switching tubes 103 and 104, a transistor 106, a condenser 107 and the switch 31. The trigger timing circuit serves to render the gas discharge tube 51 conducting when contacts of the switch 31 are closed. When the switch 31 is closed, voltage builds up in the resistance 101 until the breakdown voltage level across the gas switching tubes 103 and 104 is reached. At the time of breakdown voltage, the transistor 106 conducts because sufficient gating voltage develops on the resistor 102. During the voltage build-up during charging through the rectifiers 89 and 91, a voltage, which may be approximately 200 volts is reached on a capacitor 109. When the transistor 106 conducts and switches to ground, the capacitor 109 discharges through a transformer 111 to ground. The transformer 111 can be an auto-transformer with a ratio of 50 to 1. The high voltage terminal end of the transformer 111 ratios the 200 volts input voltage up 50 times to 10,000 volts, which high voltage is connected by a lead 112 to a trigger strip 113 of the gas discharge tube 51. This supplies sufficient voltage to ionize some of the xenon gas contained in the gas discharge tube. The initial ionization is sufficient to start current conduction from the capacitor bank including the capacitors 96, 97, 98 and 99 into the arc path of the gas discharge tube 51.

The recharging cycle through the rectifiers 89 and 91 is then repeated and the capacitor bank is recharged until the trigger timing circuit described above recycles, provided the switch 31 is closed, and the gas discharge tube 51 is retriggered. The bank of capacitors can take approximately a second to recharge. Thus, when the switch 31 is closed, pulses of intense ultraviolet radiation are delivered by the projector through the face 81 (FIG. 13) of the head 76 (FIG. 1).

When the projector is out of use, the switch 86 is moved to its other position at which the switch contacts 86B and 86C are shown closed in FIG. 14 to discharge the capacitors 96, 97, 98 and 99 to ground.

The projector delivers pulsed bursts of intense ultraviolet radiation which is concentrated at the small area of the face 81 (FIG. 13) so that intense bursts of ultraviolet radiation can be concentrated on resin coated portions of a child's teeth to cure the resin in a short period or can be used to rapidly cure resin used in other applications.

The ultraviolet radiation projector illustrated in the drawings and described above is subject to structural modifications without departing from the spirit and scope of the appended claims.

Having described my invention, what I claim as new and desire to secure by letters patent is:

1. An ultraviolet radiation projector comprising a radiation collecting rod, a gas discharge tube including a first section aligned and substantially coaxial with the radiation collecting rod and a section diverging from the first section, wherein the diverging section is helically wound around the collecting rod, a cathode of the gas discharge tube being mounted in the first section, there being a window in the gas discharge tube at the juncture between the sections extending transversely of and adjacent to an end of the radiation collecting rod, said end of the radiation collecting rod extending transversely of the axis thereof, a radiation piping rod means receiving radiation from the radiation collecting rod, radiation discharge means on the radiation piping means, and means for energizing the gas discharge tube to cause projection of ultraviolet radiation through the window into the radiation collecting rod to be discharged through the radiation discharge means.

2. An ultraviolet radiation projector as in claim 1 wherein there is a filter which passes non-harmful ultraviolet radiation between the radiation collecting rod and the radiation piping rod means.

3. An ultraviolet radiation projector as in claim 1 wherein the radiation discharge means includes a frusto-conic head end portion on the radiation piping rod means provided with a radiation discharging end wall of lesser area than the cross-sectional area of the radiation piping rod means, the ultraviolet radiation being concentrated at the radiation discharging end wall.

4. An ultraviolet radiation projector as in claim 3 wherein outer surfaces of the radiation piping rod means and of the head end portion are coated with a light reflective coating.

5. An ultraviolet radiation projector comprising a radiation collecting rod, a gas discharge tube including a first section aligned and substantially coaxial with the radiation collecting rod and a section diverging from the first section, wherein the diverging section is helically wound around the collecting rod, a cathode of the gas discharge tube being mounted in the first section, there being a window in the gas discharge tube at the juncture between the sections extending transversely of and adjacent to an end of the radiation collecting rod, said end of the radiation collecting rod extending transversely of the axis thereof, radiation discharge means for the radiation collecting rod, and means for energizing the gas discharge tube to cause projection of ultraviolet radiation through the window into the radiation collecting rod to be discharged through the radiation discharge means.

* * * * *